June 16, 1953  G. L. RAYMOND ET AL  2,641,911
COASTER
Filed Nov. 29, 1951
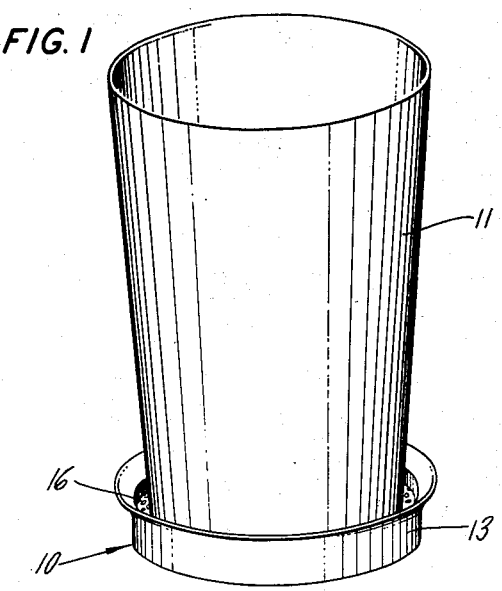
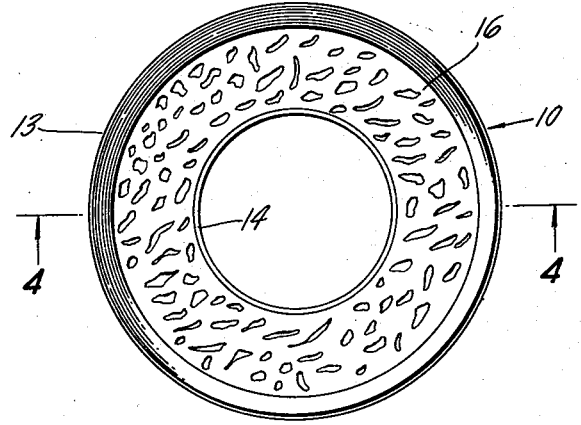
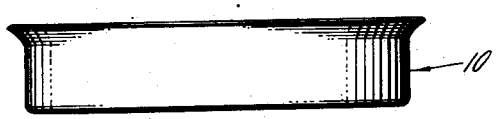 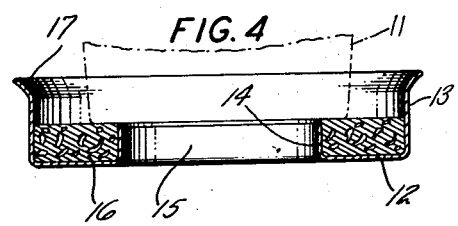
INVENTORS
GRACE L. RAYMOND
HORACE H. RAYMOND
BY Lindsey and Prutzman
ATTORNEYS Patented June 16, 1953

2,641,911

UNITED STATES PATENT OFFICE 2,641,911

COASTER

Grace L. Raymond and Horace H. Raymond, Berlin, Conn., assignors to Raymond Engineering Laboratory, Inc., Middletown, Conn., a corporation of Connecticut Application November 29, 1951, Serial No. 258,870

3 Claims. (Cl. 65—53)

The present invention relates generally to coasters and is more particularly directed to a novel and effective coaster particularly adapted for use with drinking glasses and the like containing iced or chilled beverages.

As is well known, drinking glasses containing iced or chilled beverages have a tendency to condense moisture from the air on their outer walls, particularly when the surrounding air is relatively warm and humid. The moisture so condensed on the glass rapidly accumulates to the point where droplets form and water will drip from the glass. A variety of coasters have been devised in the form of a tray or receptacle on which a glass may be removably seated for the purpose of protecting a table or other article of furniture on which the glass is to be placed but such coasters offer no effective protection to the user when the glass is lifted therefrom. Furthermore, such coasters tend to become unsightly in use and have a marked tendency to cling to the bottom of the glass which is disconcerting to the user since the coaster will spill and normally will disengage and fall shortly after the glass is raised. To overcome these objections, it has been a common practice to employ coasters which can be fitted to the glass or which include means whereby the coaster can be securely attached to the glass. Such devices tend to become comparatively complicated and are generally unsatisfactory if for no other reason than because of the time and bother involved in attaching and detaching the coasters from the glass. Furthermore, the average person does not like to have a coaster attached to his drinking glass or, if he is unfamiliar with the kind of attached coaster in use, may become confused and try to remove the same, thinking it is only one of the more tenaciously adherent coasters of the unattached variety.

The aim of the present invention is to provide a coaster which will overcome the disadvantages of the prior art which will be of the unattached variety on which the drinking glass may be easily placed and from which it can be readily lifted, which will have no appreciable tendency to stick to the glass, which will be entirely effective to protect the furniture and the user, which will function effectively over long periods of continued use, which is simple and economical to fabricate and assemble, and which is pleasing and ornamental in appearance.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a perspective view of a coaster constructed in accordance with the present invention and showing a drinking glass seated thereon;

Fig. 2 is a top plan view of the coaster;

Fig. 3 is an elevational view of the coaster; and

Fig. 4 is a vertical cross-sectional view taken as indicated by the line 4—4 on Fig. 2.

Referring to the drawings, the specific embodiment of a coaster constructed in accordance with the invention and illustrated therein is denoted generally by the reference numeral 10. In this embodiment the coaster takes the form of an annular tray having a vertical peripheral wall 13 and an inner supporting wall 14 forming a raised support for a drinking glass 11. The size of the coaster tray is such that the outer peripheral wall 13 is of greater diameter than the diameter of the drinking glass with which it is to be utilized so that the drinking glass may be readily inserted therein and withdrawn as desired. The diameter of the circular inner wall 14 is smaller than the diameter of the drinking glass so that it will engage the bottom of the drinking glass inwardly of the peripheral edge of the glass. In general, it is preferred to make the distance from the outer wall 13 to the diametrically opposite point of the inner wall 14 also smaller than the diameter of the drinking glass so that the drinking glass cannot be inserted into the coaster without having the entire upper edge of the wall 14 fall inwardly of the peripheral edge of the glass. The height of the inner wall 14 is less than the height of the outer wall 13 so that the glass will be prevented from sliding off the coaster. The inner wall 14 in the specific embodiment shown defines a through passageway 15 in the coaster. As will be apparent, the inner wall 14 is of relatively thin cross section and therefore has a relatively small surface contact area touching the bottom of the drinking glass.

Disposed between the inner wall 14 and outer wall 13 is an annular pad 16 of highly absorbent material. In general, the more absorbent the material composing the pad 16, the better the device will function. Furthermore, it is desired to use an absorbent material which will not be subject to decomposition or undergo material dimensional changes as a result of prolonged contact with water. We have found that a particularly suitable material for this purpose is the synthetic sponge-like material known in the trade as cellulose acetate sponge. Naturally occurring sponges or other sponge-like materials also are suitable.

In the specific embodiment, the pad 16 is cut in the form of an annulus so that it may be readily inserted and removed from the coaster as desired. The pad 16 is made sufficiently thick so that it will contact the peripheral edge of the drinking glass when the glass is seated on the upper edge of the wall 14. Preferably the top of the pad 16 should be substantially even with the upper edge of wall 14 as shown in Fig. 4 of the drawings. Then when the drinking glass is placed on the coaster there will be a simultaneous contact with the pad 16 and wall 14 which, in the case of the latter, will usually produce an audible click assuring the user that the glass has become securely seated. It is preferred not to make the pad materially thicker than the height of the wall 14 because otherwise an illusion of instability is created and besides the absorbent sponge-like material becomes compressed and will not absorb moisture readily from the edge of the glass.

In order that a plurality of the coasters may be stacked one upon another for storage purposes when not in use, the upper edge of the outer wall 13 is flanged outwardly as indicated at 17 to receive the bottom of the coaster next above. As will be apparent, this arrangement will keep the coasters in alignment and also will space the bottom of the upper coaster from the upper edge of the inner wall 14. Accordingly, as a result of the through opening 15, a circulation of air will occur to the pads 16 even though the coasters are in stacked relationship. This is a distinct advantage of the specific embodiment shown in the drawings because it completely avoids the necessity for drying the coasters and particularly the pads 16 prior to storage.

As a result of the construction shown in the drawings and as above described, we have found that the coaster will have all of the advantages desired by the average user and will overcome the disadvantages of the prior art devices, particularly those specifically referred to above. When constructing the invention, it was observed that the condensation and accumulation of moisture on the drinking glass occurs principally on the peripheral wall of the glass and condensation on the surface of the bottom is negligible. The moisture normally found on the bottom of drinking glasses containing iced beverages results from a run-off from the side wall of the glass or else is deposited thereon by the coaster or other supporting surface on which the glass is placed. It has been discovered that, by placing a highly absorbent material in contact with the peripheral edge of the bottom of the glass, the moisture accumulating on the glass will be rapidly drawn off and absorbed before it can accumulate to the point where the glass will drip moisture, and the accumulation of water on the bottom surface of the glass is prevented. It has been further discovered that by supporting the bottom surface of the glass inwardly of the peripheral edge with a support having a relatively small contact surface area, the tendency of the glass to adhere to the coaster is reduced to the point where the weight of the coaster, even though it is of very light construction will immediately disengage the coaster from the drinking glass when the drinking glass is raised. Furthermore, the inner supporting wall 14 prevents the drinking glass from materially compressing the pad 16 of absorbent sponge-like material so that the absorbency of the pad is kept at a maximum and, even though the pad accumulates considerable quantities of water, it will not be released when the drinking glass is inserted on the coaster, which otherwise would tend to deposit water on the glass. Since the absorbent sponge-like material of the pad 16 is not placed under compression, it will absorb great quantities of water and, even though the pad is of relatively small dimensions, it will adequately contain all of the liquid that ordinarily will be drawn off from the drinking glass over a normal period of use. Even though the pad 16 should become saturated with water, there would be no danger of damage to the table or other article of furniture on which the coaster is placed because the remaining portions of the coaster form a protective tray or shell enclosing the pad.

It has been found that the absorption of water from the surface of the drinking glass as a result of the coaster construction of our invention is so efficient and rapid that, when the drinking glass is removed from the coaster in order for the user to drink therefrom, there will be insufficient time for enough additional moisture to condense on the surface of the drinking glass to reach the dripping stage, this being true even though the drinking glass is not rapidly returned to the coaster.

The tray or shell portion of the coaster 10 may be made of any suitable material desired. Sheet materials such as aluminum, brass or steel and moldable plastic materials are among those which may be successfully utilized, for example. Because of the simplicity of the coaster, the shell or tray portion may be easily fabricated by molding, stamping or spinning processes, as will be apparent to one skilled in the art.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim as our invention:

1. A coaster for drinking glasses and the like comprising a tray having an outer peripheral wall of greater circumference than the drinking glass to be seated on the coaster so as to be spaced outwardly therefrom, a rigid, centrally located, vertically extending, continuous wall disposed about a passage of lesser diameter than the bottom of the drinking glass, said inner wall being of lesser height than the peripheral wall and forming a support of small contact area for the bottom of the drinking glass within the periphery thereof, and a pad of absorbent sponge-like material which when wet is compressible by the weight of a drinking glass, said pad being disposed in the tray between said walls and surrounding said passage and having a thickness substantially equal to the height of the inner wall but slightly higher when dry, said pad being high enough to draw off water from the peripheral edge of the bottom of a drinking glass seated on the inner wall and being thin enough to permit the weight of the glass to be supported substantially entirely by the inner wall.

2. A coaster for drinking glasses and the like comprising a generally annular tray having an outer peripheral wall of greater circumference than the drinking glass to be seated on the coaster so as to be spaced outwardly therefrom and a rigid, vertically extending inner wall of thin cross-section surrounding a central through opening in the tray of smaller area than the bottom of a drinking glass, said inner wall being of lesser height than the peripheral wall and the upper edge thereof forming a support of small contact area for the bottom of the drinking glass substantially within the periphery thereof, and a pad of absorbent sponge-like material slightly compressible when wet, said pad being disposed in the tray between said walls and surrounding said opening, said pad having a thickness substantially equal to the height of the inner wall but slightly higher when dry so as to contact the peripheral edge of a drinking glass whose weight is supported on said inner wall of the tray.

3. A coaster in accordance with claim 2 in which the outer wall is provided with an upwardly facing surface at a greater height than the inner wall to permit the coaster to be stacked with similar coasters with the bottom of the tray of the upper coaster seated on said surface of the lower coaster and spaced above the upper edge of the inner wall of the lower coaster so as to permit circulation of air to the pad of absorbent material of the lower coaster through the said central opening.

GRACE L. RAYMOND.
HORACE H. RAYMOND.

References Cited in the file of this patent

UNITED STATES PATENTS

| Number | Name | Date |
|---|---|---|
| 508,140 | Koch | Nov. 7, 1893 |
| 652,268 | Hoffmann | June 26, 1900 |
| 715,828 | Markmann | Dec. 16, 1902 |
| 1,683,977 | Keiner | Sept. 11, 1928 |
| 2,041,563 | Meinecke | May 19, 1936 |
| 2,113,888 | Kaparin | Apr. 12, 1938 |
| 2,345,784 | Wolcott | Apr. 4, 1944 |
| 2,561,127 | Lockwood | July 17, 1951 |

FOREIGN PATENTS

| Number | Country | Date |
|---|---|---|
| 8,647 | Germany | Feb. 26, 1880 |
| 578,281 | France | June 27, 1924 |
| 725,715 | France | Feb. 16, 1932 |